(12) United States Patent
Perazio et al.

(10) Patent No.: US 11,302,073 B2
(45) Date of Patent: Apr. 12, 2022

(54) METHOD FOR TEXTURING A 3D MODEL

(71) Applicant: SOLETANCHE FREYSSINET, Rueil Malmaison (FR)

(72) Inventors: Guy Perazio, Saint-Romans (FR); Jose Peral, Moirans (FR); Serge Valcke, Apprieu (FR); Luc Chambaud, Moirans (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 4 days.

(21) Appl. No.: 16/591,947

(22) Filed: Oct. 3, 2019

(65) Prior Publication Data
US 2020/0111253 A1     Apr. 9, 2020

(30) Foreign Application Priority Data
Oct. 3, 2018   (FR) ...................................... 18 59189

(51) Int. Cl.
*G06T 17/20*     (2006.01)
*G06T 15/04*     (2011.01)

(52) U.S. Cl.
CPC .............. *G06T 17/20* (2013.01); *G06T 15/04* (2013.01); *G06T 2219/021* (2013.01)

(58) Field of Classification Search
None
See application file for complete search history.

(56) References Cited

U.S. PATENT DOCUMENTS

| 8,279,218 B1* | 10/2012 | Fan ..................... G06T 15/04 |
| | | 345/419 |
| 2010/0194768 A1* | 8/2010 | Schrag ................... G06T 19/00 |
| | | 345/584 |

(Continued)

OTHER PUBLICATIONS

Preliminary French Search Report dated May 17, 2019 in French Application 18 59189 filed on Oct. 3, 2018 (with English Translation of Categories of Cited Documents & Written Opinion).

(Continued)

*Primary Examiner* — Jennifer Mehmood
*Assistant Examiner* — Jed-Justin Imperial
(74) *Attorney, Agent, or Firm* — Oblon, McClelland, Maier & Neustadt, L.L.P.

(57) ABSTRACT

Method for texturing a 3D model of at least one scene (5), comprising:
a) the meshing with surface elements (50; 55) of a point cloud (45) representing the scene, so as to generate the 3D model, each surface element representing an area of the scene,
b) the unfolding of the 3D model for obtaining a 2D model formed of a plane mesh (60*a*; 60*b*) formed of polygons (65), each surface element corresponding to a single polygon, and vice versa, and
c) for at least one, preferably all the surface elements,
   iv) the identification, from an image bank (40*a*; 40*b*), of the images representing the area of the scene and which have been acquired by a camera the image plane (72*a-b*) of which has a normal direction, in the corresponding acquisition position, forming an angle ($\theta_{a-b}$) less than 10°, preferably less than 5°, better less than 3° with a direction normal (70) to the face of the surface element,
   v) the selection of an image (40*a-b*) from the identified images, and, (Continued)

vi) the association of a texture property with a corresponding polygon (65), from a piece of information of a pixel (80; 85) of the selected image which is superimposed on the surface element (55), so as to produce a textured 2D model, and d) the production of the textured 3D model by matching the 3D model and the textured 2D model.

18 Claims, 5 Drawing Sheets

(56) References Cited

U.S. PATENT DOCUMENTS

| 2016/0086336 A1* | 3/2016 | Lin | G06T 7/74 348/50 |
|---|---|---|---|
| 2019/0096119 A1* | 3/2019 | Petkov | G06T 7/11 |

OTHER PUBLICATIONS

Kang, J, et al., "Automatic Texture Reconstruction of 3D City Model From Oblique Images", The International Archives of Photogrammetry, Remote Sensing and Spatial Information Science, vol. XLI-B1, 2016, 7 pages.

Zhou, G, et al., "Texture mapping based on multiple aerial imageries in urban areas", International Conference on Intelligent Earth Observing and Applications, Proc. of SPIE, vol. 9808, 2015, 6 pages.

Janko, Z, et al., "Creating Entirely Textured 3D Models of Real Objects Using Surface Flattening", Machine Graphics & Vision, 2005, 19 Pages.

* cited by examiner

METHOD FOR TEXTURING A 3D MODEL

The invention relates to a method for texturing a 3D digital model.

For displaying a digital model of a scene including a set of real 3D objects, e.g. on a screen or by means of an augmented reality headset, it is known to construct 3D surfaces which model the outer envelope of each of the objects. For this, a known method consists in meshing, by means of surface elements, generally of triangular shape, a point cloud obtained by a method of measuring the relief of the object, such as stereoscopy or Lidar (acronym for "Light Detection And Ranging"). The points then define the vertices of the surface elements of the mesh. Such a method is described, for example, in the course note "*Maillage 2D, surfacique et 3D*" (*2D, surface and 3D meshing*), Pascal Frey and Frederick Hecht; in the thesis by Samuel Bidal (2003) "*Reconstruction tridimensionnelle d'éléments anatomiques et génération automatique d'éléments finis optimisés*" (*Three-dimensional reconstruction of anatomical elements and automatic generation of optimized finite elements*); in the thesis by Suhail Hajri (2010) "*modélisation des surfaces rocheuses naturelles à partir d'une scannérisation laser 3D et extraction automatique de formes caractéristiques: application aux spéléothèmes et surfaces géologiques*" (*modeling natural rock surfaces from a 3D laser scan and automatic extraction of characteristic forms: application to speleothems and geological surfaces*).

A step of texturing the meshed surface is then implemented, during which a property, generally a color, is assigned to each element of the meshed surface. In order that the display of the meshed and textured surface visually represents the scene as faithfully as possible, most texturing models aim to assign a color close to that of the portion of the object that the mesh element aims to model. For example, when the point cloud is obtained by photographic image acquisition, a color may be associated with each point of the point cloud, in a defined colorimetric space, e.g. RGB. A texture may then be associated with each surface element by interpolating the associated colorimetric data, e.g. linearly between the vertices of the element.

The actual color of the object between the points of the cloud is therefore not taken into account, so that the display of the digital model may result in the production of visual artifacts. A consequent increase in the number of cloud points is one of the conceivable means for reducing the number of visual artifacts, but it is then accompanied by a substantially exponential increase in the number of surface elements. It is then necessary to use computers fitted with powerful and expensive graphics cards to display the digital model.

There is therefore a need for a 3D digital model overcoming the drawbacks listed above.

The invention aims to satisfy this need, and relates to a method for texturing a 3D model of at least one scene, the method comprising:

a) the meshing with surface elements of a point cloud representing the scene, so as to generate the 3D model, each surface element representing an area of the scene, b) the unfolding of the 3D model for obtaining a 2D model formed of a plane mesh of polygons, each surface element corresponding to a single polygon, and vice versa, and c) for at least one, preferably all the surface elements,
   i) the identification, from an image bank, of the images representing the area of the scene and which have been acquired by a camera the image plane of which has a normal direction, in the corresponding acquisition position, forming an angle less than 10°, preferably less than 5°, better less than 3° with a direction normal to the face of the surface element,
   ii) the selection of an image from the identified images, and,
   iii) the association of a texture property with a corresponding polygon, from a piece of information of a pixel of the selected image which is superimposed on the surface element, so as to produce a textured 2D model, and d) the production of the textured 3D model by matching the 3D model and the textured 2D model.

For the same number of points, the textured 3D model obtained by the method according to the invention comprises more details of the scene than a textured 3D model obtained by the interpolation method of the prior art described above. The textured 3D model may further be displayed without the need to implement a more powerful graphics card. In addition, its display reflects the scene more faithfully.

"Scene" should be understood to mean a portion of an environment that can be observed by an image acquisition device when it is stationary at a given location.

The environment may be an underground facility, such as a gallery of a sewer or a mine, or be outside. In particular it may be urban or rural.

The scene comprises at least one, preferably more objects. The object may be a structure, such as a bridge or a tunnel, a building, a house, a stadium, a ship, a warehouse, an item of street furniture, such as a bus shelter, a signboard, or a traffic light. It may be a piece of furniture or a decorative item. It may be a natural element, such as a tree or a rock.

In step a), the point cloud may be obtained by reconstruction from images of the scene that intersect, from a LIDAR acquisition or else from a combined use of these two techniques.

Preferably, the method comprises a step, prior to step a), wherein the scene is discretized in the form of the point cloud, from an image bank comprising images each representing a portion of the scene seen by at least one camera and wherein at least two images acquired at different positions represent portions of the scene that overlap. The image bank is preferably identical to that used in step i).

The discretization of the scene is preferably performed by photogrammetric processing of the bank's images. Thus, the images are advantageously used both to generate the point cloud and to texture a surface element of the 3D model. Photogrammetric processing may implement a conventional stereo vision algorithm, which identifies component elements of a scene on different images acquired along different viewing axes, then determines the relative positions of said component elements. For example, the photogrammetric processing is implemented by means of the PhotoScan software product published by Agisoft.

The image bank may be recorded on a computer storage medium such as a hard drive or an SSD or Flash memory. The images are preferably recorded in a raw format, e.g. of the .raw type. A "raw" format is understood to mean an image recording format in which the colorimetric information collected by a camera sensor is re-transcribed directly to a pixel of the image, without being altered by a step of development and digital compression, as is the case, for example, during the recording of a .jpg or .png file. The images may each comprise more than 1 million, or even more than 4 million, or even more than 8 million, better more than 16 million pixels.

The image bank may comprise images representing portions of different scenes. For example, it comprises more than 200 million images.

At least two images of the bank acquired at different positions represent portions of the scene that overlap. The overlapping of the images facilitates the discretization of the scene, notably by photogrammetry. Preferably, the rate of overlap between said two images is greater than 70% or even greater than 80%, e.g. greater than 90%. The angular overlap may be calculated:

optionally, by projecting one of the two images in a plane the normal of which is parallel to the viewing axis of the camera in the position in which the other image has been taken, then by matching, e.g. through image correlation, the image, optionally projected, and the other acquired image, so as determine the common area between the image, optionally projected, and the other image, and by expressing in percentages the ratio of the number of pixels of the matched area to the number of pixels of the other image.

For example, the projection step described above is performed when the angle between the viewing axes of the camera or cameras in the different positions is greater than 5°.

Preferably the image bank comprises images acquired at the same acquisition location by different cameras. In this way, the construction of the point cloud is facilitated, these images being capable of being intercorrelated. Preferably, the bank comprises images acquired in the same acquisition location, e.g. by cameras oriented differently from each other, representing the scene over an angular aperture greater than 90°, or even greater than 180°, or even greater than 270°, in particular equal to 360°.

An image comprises, in each pixel that composes it, at least one piece of pixel information. The pixel information characterizes a property of the material constituting the portion of the scene imaged by the camera in the pixel. The pixel information may result from the acquisition of the image by the camera. As a variant, the pixel information may be measured independently of how the image is acquired and subsequently be assigned to the pixel after the acquisition of the image.

Preferably, the pixel information is a color, defined in a colorimetric space, e.g. RGB or CMNY. The images of the bank are then acquired, for example, by at least one camera comprising a light sensor in the visible.

As a variant, the pixel information may be selected from:
a thermal property, e.g. selected from a thermal flux and a temperature,
an optical property, e.g. a brightness or a refractive index,
an electromagnetic property, e.g. a magnetic field intensity,
a mechanical property, e.g. selected from a hardness and a modulus of elasticity,
a radiological property, e.g. a gamma ray flux,
a water property, such as a humidity ratio.

Each image may comprise for each pixel which composes it, multiple pieces of pixel information different from each other. For example, one image may comprise in each pixel the color and the temperature of the portion of an imaged object in the pixel.

Furthermore, the image bank may comprise metadata, preferably associated with each image, or even each pixel of each of the images.

The metadata may comprise at least one piece of information relating to the camera selected from an identifier of the camera having acquired the image, the position and the accuracy on the position, e.g. detected by GPS from the camera having acquired the image, the orientation of the viewing axis of the camera, and the focal length and aperture of the camera lens. The camera's position is considered to be the position, in a reference frame of the scene, of the center of the image plane of the camera, through which the optical axis of the camera passes. The camera's orientation is considered to be the direction of the optical axis of the camera. The metadata may comprise the date of acquisition of the image, and other EXIF data. Furthermore, the x, y, z coordinates of the system associated with the 3D model may also be added to these metadata.

Furthermore, the image bank preferably comprises at least one, preferably a plurality of images whereof the portion representing the area of the object modeled by the surface element has a resolution greater than 50 px·mm$^{-2}$ [pixels per square millimeter], preferably greater than 70 px·mm$^{-2}$, preferably greater than 80 px·mm$^{-2}$, or even preferably greater than 90 px·mm$^{-2}$, better greater than or equal to 100 px·mm$^{-2}$, on the basis of the surface area of the area of the object modeled by the surface element. Thus, it is possible to assign a texture to the surface element with a resolution of the order of, or even greater than, that of the human eye. In other words, an observer of a display of the textured 3D model obtained by the method according to the invention may discern in the surface element all the details of the area of the object that they would observe if they were facing the object.

Preferably, prior to step a), the image bank implemented in step i) is generated by moving, in a plurality of acquisition locations, a scanning device comprising at least one camera, and, at each acquisition location, a portion of the scene seen by the scanning device is acquired by taking at least one image by means of the camera, the acquisition locations being selected such that the portions of the scene seen by the scanning device in two respective consecutive acquisition locations at least partially overlap. Preferably, the acquisition device comprises an acquisition module comprising a rod and at least two acquisition stages arranged at different heights on the rod, each acquisition stage comprising a plurality of cameras configured for each acquiring an image of the scene, the viewing axes of the cameras of an acquisition stage being distributed angularly about the axis of the rod so that the acquired images angularly overlap. The rod may be adapted to be carried by an operator moving in the environment. It may comprise a foot at the bottom for placing it on the ground. The device may comprise at least three, preferably three acquisition stages. The cameras of each stage being distributed about the longitudinal axis of the rod, over a total angular sector of between 90° and 120°, preferably between 150° and 190°, in particular equal to 180°. The spacing between the acquisition stages may be adjustable. The cameras of an acquisition stage are preferably attached to each other. The acquisition module may comprise at least six, preferably at least ten, preferably at least twelve, notably fifteen cameras.

Acquisition of the images is preferably performed by means of the image acquisition device described in application FR 1856591 incorporated herein by reference.

In step a), the meshing of the point cloud is performed by means of surface elements. It may be achieved by means of special software, referred to as a mesher, well known to the person skilled in the art, such as 3D Reshaper or Photoscan. The mesh formed in step a) may comprise, or even consist of quadrangular elements and/or preferably triangular surface elements, better suited to the meshing of 3D surfaces.

Preferably the ratio of the number of images of the bank representing the scene over the number of elements of the surface mesh is greater than 1, preferably greater than 100, preferably greater than 300. Thus, the image bank comprises a particularly high amount of pixel information for defining a detailed texture for each surface element of the mesh.

In step b), "unfolding" is understood to mean the mathematical operation by which the 2D model is matched to the 3D model, by associating a single pair of 2D coordinates, usually denoted by (u, v), of a vertex of a polygon of the plane mesh to a vertex of the surface element of the 3D mesh to which it corresponds. In other words, after unfolding the 3D model, a "flat pattern" is obtained which comprises in a single plane, the set of three-dimensional surfaces of the 3D model flattened out in the plane. Such an operation, well known to the person skilled in the art, is conventionally known as UV Mapping.

"Plane mesh formed of polygons" is understood to mean that all the vertices of the polygons of the mesh are contained in one plane.

Preferably, the number of vertices of a polygon and a corresponding surface element are identical. Preferably, each polygon is a triangle and each surface element is a triangle.

Preferably, the polygon and the surface element have the same shape and the same dimensions.

Unfolding allows the texturing of simple or complex 3D models.

The 2D model may comprise one or more connected meshed 2D surfaces, preferably a single connected meshed 2D surface. "Connected" surface is understood to mean a surface delimited by a single boundary line closing upon itself. For example, the surface defined by a rectangle is a connected surface. On the other hand, the area delimited by two concentric circles of different diameters is not connected.

Preferably, step b) of unfolding is conducted so as to obtain the lowest possible number of connected areas. By way of example, in the presence of hollow areas in the 3D model, as is the case between the handle and the bottom of a modeled basket, for example, it is possible to unfold portions of the 3D model independently of each other. E.g. the handle of the basket discretized in the model is unfolded independently of the rest of the model of the basket.

Preferably, in step b), the unfolding is achieved by minimizing the number of surfaces of the 2D model and by minimizing the number of orphans in the connectivity table of the 2D model. A 3D, respectively 2D, mesh is characterized by a connectivity table, indicating for each vertex of a surface element, respectively of a polygon of the mesh, to which surface elements, respectively polygons, it belongs. An "orphan" corresponds to the mathematical impossibility of retaining, for a vertex of a polygon in the 2D model, the connectivity information of the vertex of the corresponding surface element.

Preferably, the orphan rate, calculated as the ratio of the number of orphans over the number of points of the 3D model, expressed in percent, is less than 30%, preferably less than 10%, or even less than 5%.

Thus a 2D model is obtained easily handled by the operator implementing the method, and the production of the textured 3D model is facilitated. As will be illustrated later, the operator may more easily intervene on the textured 2D model thus unfolded to correct the artifacts that they could observe on the textured 3D model.

Unfolding may be performed automatically with software known to the person skilled in the art, such as Blender, Autodesk Maya, Cinema 4D. As a variant, it may be carried out semi-automatically, the operator being able to override the limitations of the automatic methods, particularly encountered in the case where these automatic methods generate a high number of non-connected surfaces.

In step c), the 2D model is textured from the pixel information of images in the bank. The generation of the textured 2D model facilitates the generation of the textured 3D model, as will be explained in step d) below.

Step c) is implemented for at least one, preferably all of the surface elements of the 3D model generated in step a).

In step i) the images of the bank are identified, which represent the area of the scene and which have been acquired by a camera the image plane of which has a normal direction, in the corresponding acquisition position, forming an angle less than 10°, preferably less than 5°, better less than 3°, with a direction normal to the face of the surface element. The identification may be performed, from the knowledge for each image of the bank of the position and/or the orientation of the camera that acquired the image. The position and/or the orientation of the camera may be a piece of metadata or result from the photogrammetric processing of the images. For example, an image is discarded when it has been taken by a camera oriented in a direction substantially opposite to the area of the object delimited by the surface element considered.

Step i) is aimed at determining the images that appear the best oriented with respect to the surface element, so as to assign it the pixel information contained in one of these images.

Preferably, for further improving the quality of texturing in step d), the method comprises an intermediate step i') between steps i) and ii), wherein the sharp images are identified from among the images determined in step i).

The sharpness of an image may be determined by means of at least one descriptor such as the maximum gradient. The gradient of the image measures the local variation of the colorimetric intensity of the pixels. The greater the value of the gradient, the more the details of the image are visible. The sharpness may also be determined simply and easily through the eye of the operator implementing the method.

Preferably, the method further comprises an intermediate step i") between steps i') and ii), wherein, from among the images determined in steps i) and i'), the image is identified that is taken by the camera the image plane of which is the closest to the surface element. Thus, from among the best oriented and sharpest images, that which has been acquired closest to the area of the object modeled by the surface element is identified. Such an image is that which comprises the most pixels, and therefore associated information describing the area of the object modeled by the surface element.

In a variant implementation of the method, in step i), the image may be selected whereof the image plane of the camera has a normal direction, in the corresponding acquisition position, making the smallest angle, with a direction normal to the face of the surface element. Such an image is not necessarily the sharpest and/or that acquired by the camera the image plane of which is closest to the area of the object modeled by the surface element, but has the advantage of being the best oriented with respect to the surface element.

In step ii), an image is selected from among the images identified in step i), or where appropriate in step i') or ii'). Preferably, the image identified in step i") is selected.

In a variant, prior to step i) from among the set of images of the bank, a subset of images may be selected which have been acquired in an acquisition location located at a distance less than a predetermined maximum distance from the surface element. The images identified in step i) are then in the subset. The computation time in step i) is thus reduced, together with the execution time of step c).

Furthermore, in order to identify the images in step i), characteristic points may be recognized common to the 3D model and to the images of the bank. This recognition may be performed e.g. by means of a neural network trained to recognize characteristic points or any optimization algorithm, e.g. by least squares.

In step iii), a texture property is associated with the corresponding polygon of the 2D model, from a piece of information provided by each pixel of the selected image which is superimposed on the surface element. Thus a textured 2D model is generated.

This pixel may be partially superimposed with the surface element, when it is superimposed with an edge connecting two vertices of the surface element. It may be completely superimposed inside the surface element.

Since there is univocal correspondence between a polygon and the surface element, the information of the pixel or all the partially and/or fully superimposed pixels on the surface element may be associated with the corresponding polygon. Thus, a polygon may have a number of values of the texture property corresponding to the number of pixels for which a piece of information has been associated.

Furthermore, multiple pieces of texture information may be assigned to the same polygon, notably when multiple pieces of pixel information are assigned to the same pixel.

At least one pixel is superimposed at least partially inside at least one, preferably each polygon.

Finally, additional processing may be performed on the textured 2D model, notably when the textures reconstructed from multiple images of the bank contain variations in hue and/or brightness and/or contrast between the different images. For example, in the textured 2D model, a polygon after a texturing may have a duller average hue than the polygons to which it is connected. To lessen or even eliminate such differences in hue and/or brightness and/or contrast, smoothing and/or filtering may be applied to reduce the texture property gradient between the connected polygons.

Finally, in step d) the textured 3D model is produced by matching the 3D model and the textured 2D model.

As has been mentioned, during the unfolding in step b), a match has been established between each polygon and its corresponding surface element.

The set of texture information associated with the 2D model in step iii) may therefore be easily transmitted to the 3D model by simple bijective operation, which is, for example, performed automatically by means of an unfolding software product such as those mentioned in step b).

Furthermore, the method may be implemented for texturing a 3D model modeling multiple scenes of an environment, the image bank comprising images each representing at least one portion of one of the scenes. Preferably, the scenes are contiguous with each other. Prior to step a), the scenes may be discretized one at a time and independently of each other from the image bank, and the point clouds representing each scene are then assembled together by means of suitable software such as Photoscan. As a variant, the scenes may be discretized together, thereby forming a single point cloud.

The method may further comprise the display on a screen, e.g. of a computer or an augmented reality headset, of a visual representation of the textured 3D model of a scene. Notably, a color and/or a transparency may be assigned to the texture information, for the display of the model. For example, the texture information may be a temperature and different colors are assigned to different temperatures. The observer may thus easily view hot areas, e.g. in red, and cold areas, e.g. in blue by virtually moving in the scene.

The invention further relates to a computer for implementing the method according to the invention, the computer preferably comprising:
 a. at least one storage unit which records the image bank and where appropriate the associated metadata, and instructions for the implementation of the method, and
 b. a processor for executing the instructions.

The invention finally relates to a computer data storage module, which records the textured 3D model obtained by the method according to the invention. The storage module is, for example, a hard disk.

The invention may be better understood on reading the following detailed description of non-restrictive implementations thereof, and on examining the appended drawing, in which.

Figure 1:
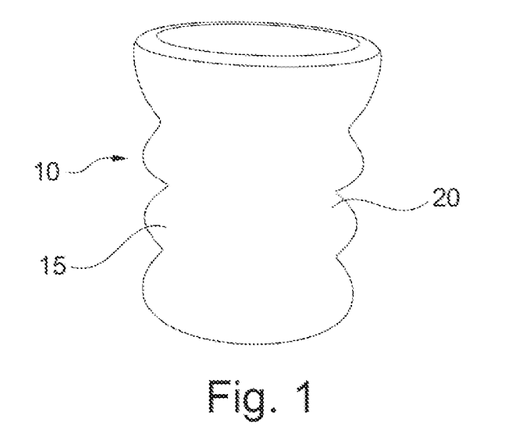
FIG. 1 represents a scene of an environment to be modeled.

FIG. 1 represents a scene 5 of an environment 10. For illustrating the implementation of the method, interest will be more specifically focused hereafter on an object 15 included in the scene. In this case, the object is a vessel which has a curved outer envelope 20.

Figure 2:
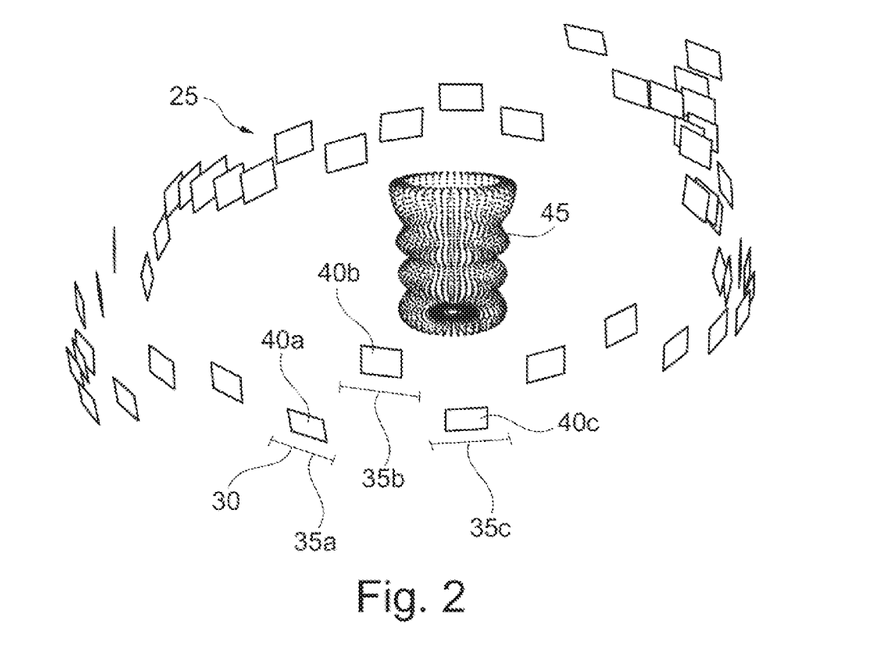
FIG. 2 illustrates an acquisition of the scene.

An image acquisition device 25 comprising a camera 30 is arranged in the environment in a plurality of acquisition locations 35*a-c*. The camera acquires at least one image 40*a-c* of the scene in each acquisition location. The acquisition locations are selected so that the acquired images overlap in at least two locations.

An image bank is thus formed, comprising the set of images of the scene acquired by the image acquisition device.

Figure 3:
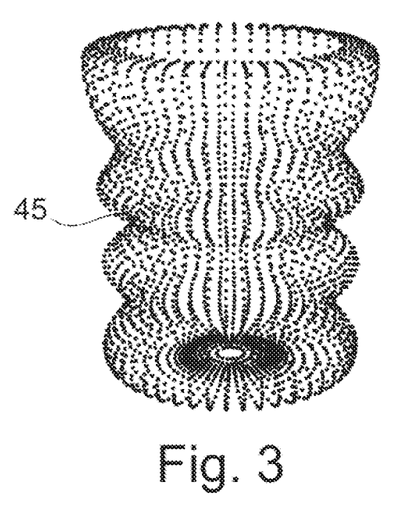
FIG. 3 represents a point cloud representing an object in the scene.
Figure 4:
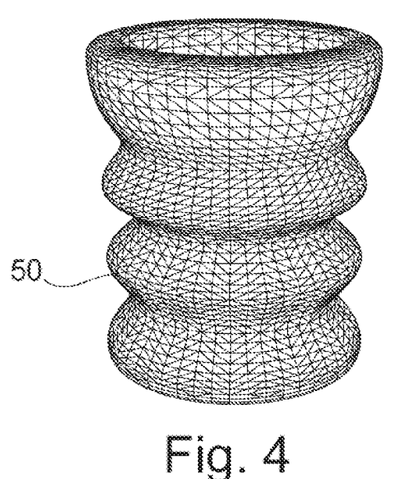
FIG. 4 represents the meshed object of the modeled scene.

A point cloud 45 is then generated by photogrammetric processing of the images by means of the Photoscan software, then is meshed by means of surface elements 50 of triangular shape. Thus, a meshed 3D model of the scene is obtained, which is illustrated in FIG. 4.

Thereafter, the texturing of the scene is implemented.

Figure 5A:
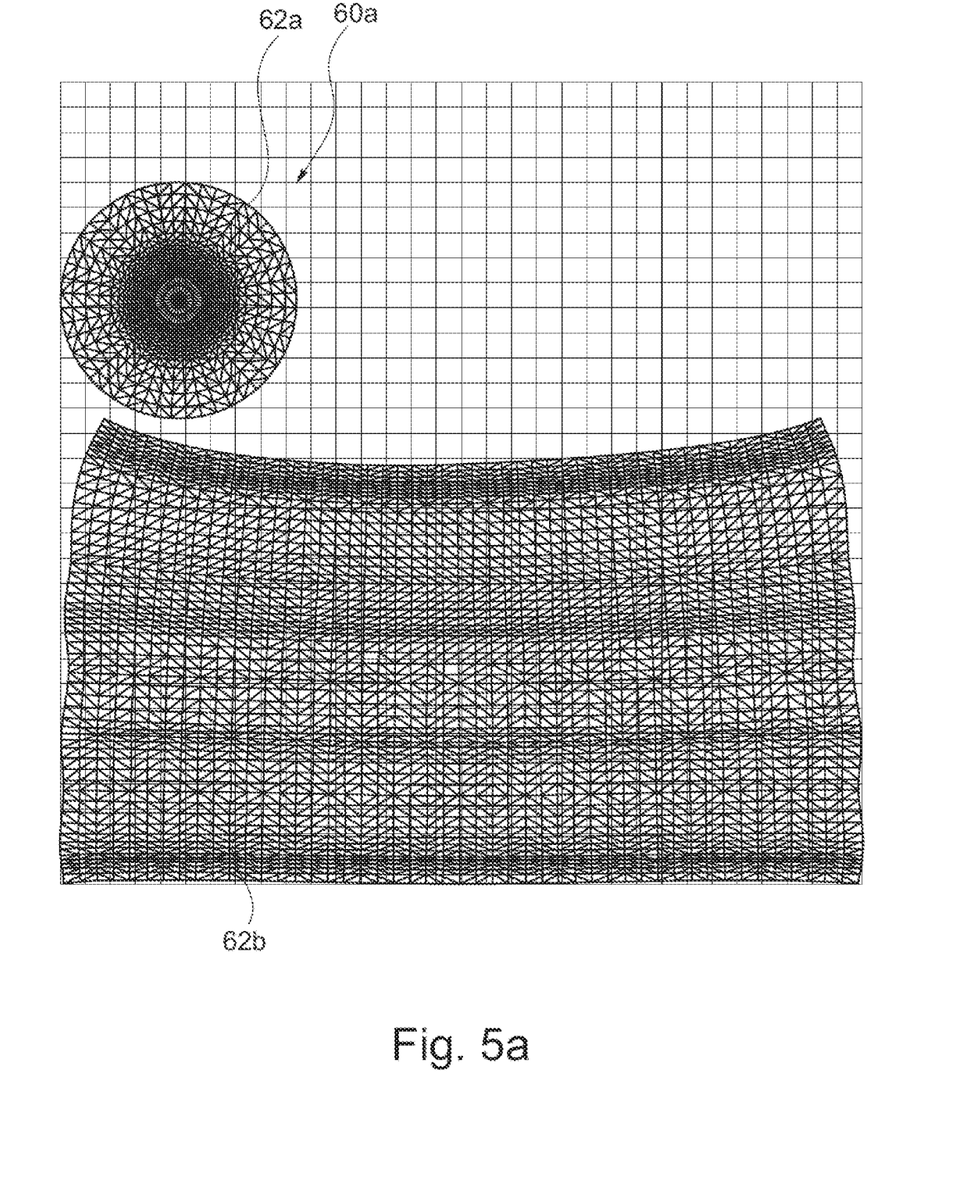
FIGS. 5*a* and 5*b* represent a 2D model obtained by a semi-automatic unfolding and by an automatic unfolding by means of the Blender software respectively.

The 3D model is then unfolded to obtain a 2D model 60*a* formed of a plane mesh comprising two connected 2D meshed surfaces 62*a* and 62*b*, as illustrated in FIG. 5*a*. The surface 62*b* corresponds to the lateral face of the vessel in the plane and the surface 62*a* corresponds to the bottom of the vessel unfolded in the plane. The semi-automatic unfolding illustrated in FIG. 5*a* is achieved by minimizing the number of 2D surfaces.

Figure 5B:
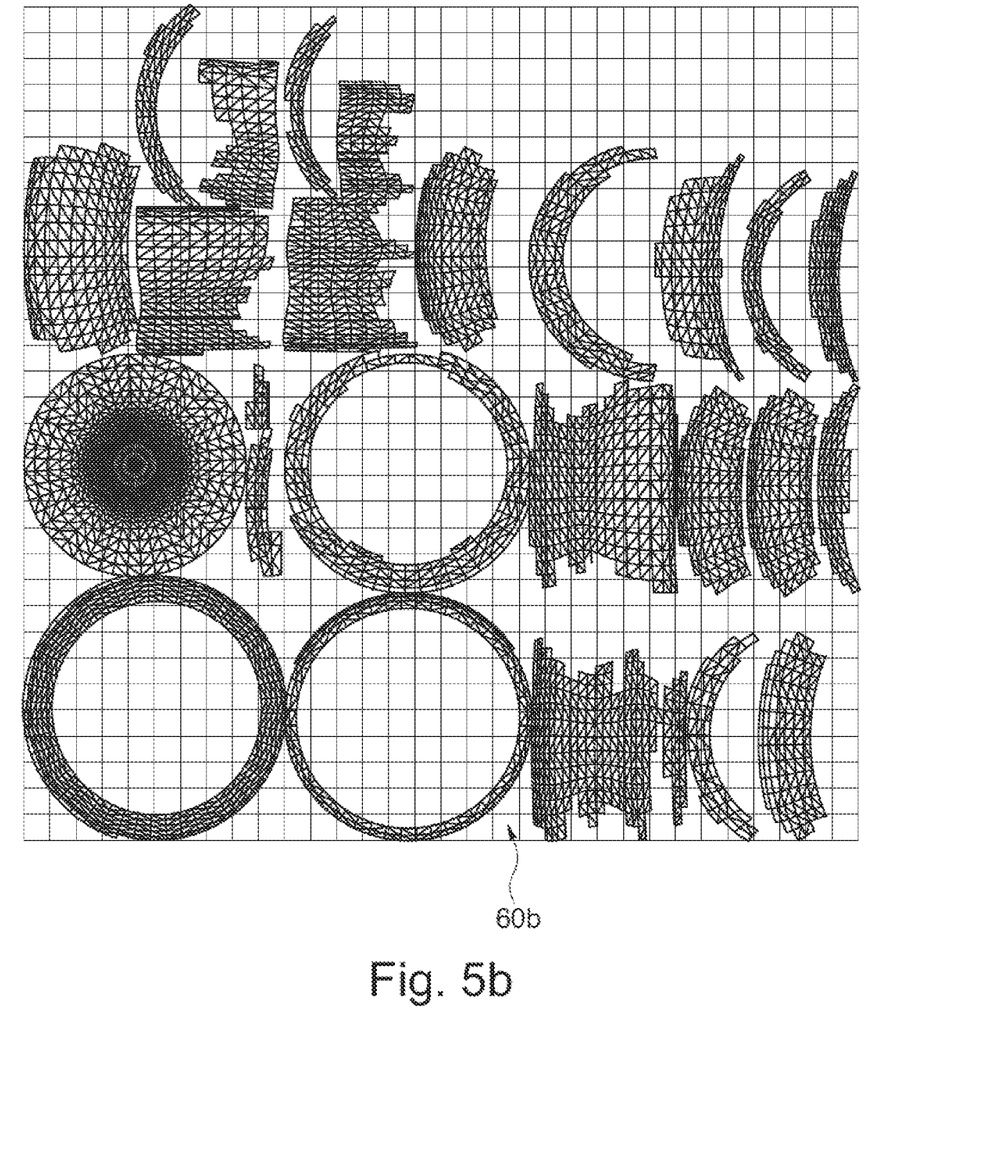

As is clearly apparent, the semi-automatic unfolding illustrated in FIG. 5a, in comparison with the automatic unfolding illustrated in FIG. 5b, in addition to the fact that it minimizes the number of 2D surfaces, better preserves the connectivity of the 3D mesh. FIG. 5b illustrates a 2D model 60b obtained by automatic unfolding by means of the Blender software product. This results in a greater number of surfaces, and notably non-connected surfaces. It is also more difficult for the operator to visually associate in the 2D model 60b, the polygon corresponding to a surface element of the 3D model.

A texture is then associated with the 2D model.

For illustrative purposes, the focus of interest here is on one 55 of the surface elements modeling the object. The detailed processing below is implemented for each surface element discretizing the scene.

The normal 70 of the surface element, external to the object, is calculated from the position of the vertex points of the element. The images of the bank are then identified which represent the area of the scene delimited in the 3D model by the surface element, which are in the example illustrated in FIG. 6, the images 40a and 40b.

Figures 6, 7:
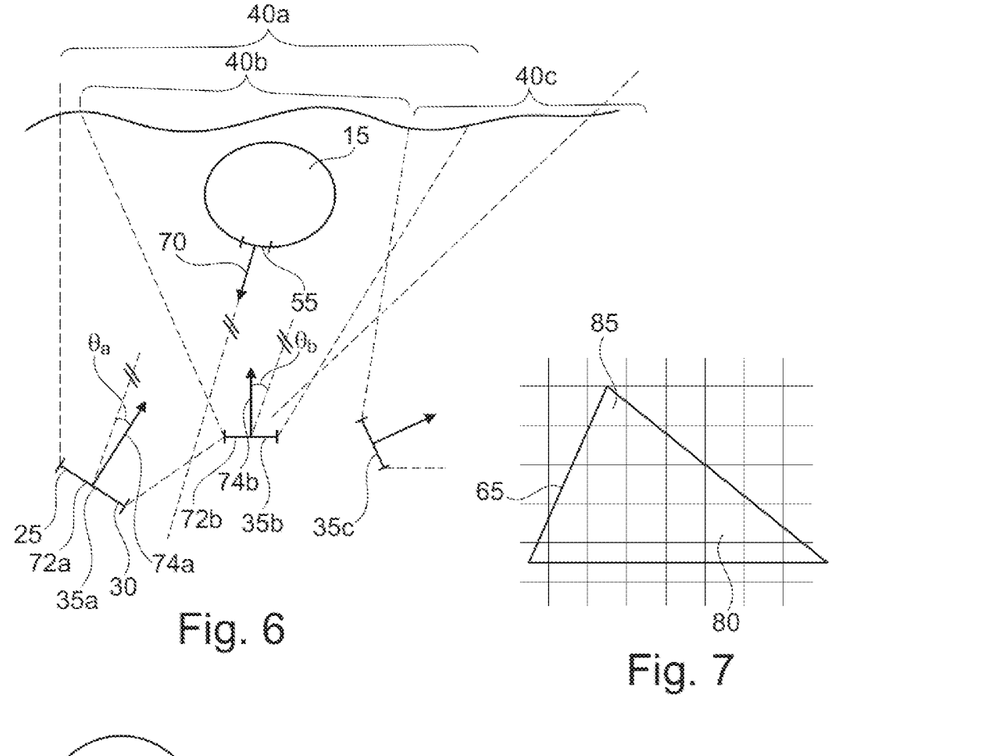
FIG. 6 illustrates the steps of identifying images and selecting an image for a surface element of the meshed object.
FIG. 7 illustrates step iii) of the association of a texture property with a polygon of the 2D mesh from the pixel information of the selected image.
Figure 8:
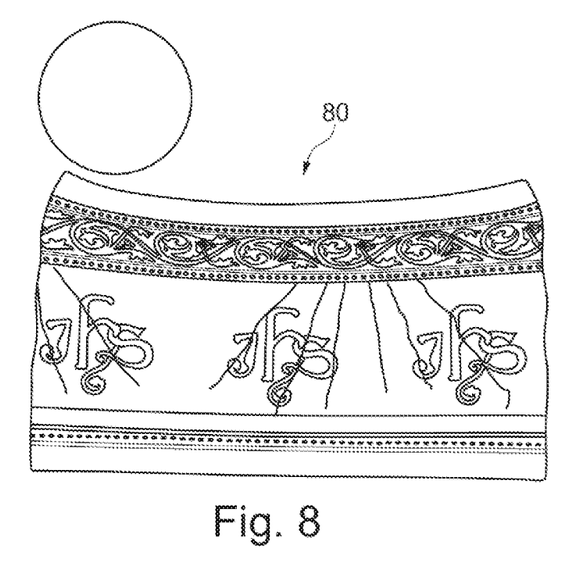
FIG. 8 represents the textured 2D model obtained from the 2D model of FIG. 5*a*.

From the images 40a and 40b, the image or images are identified which have been acquired by a camera the image plane 72a-b of which has a normal direction 74a-b, in the corresponding acquisition position, forming an angle $\theta_{a-b}$ less than 10° with a direction normal to the face of the surface element.

In the example illustrated in FIG. 6, the two images 40a and 40b satisfy the condition mentioned in the preceding paragraph.

Each of these images may be selected and be superimposed with the surface element in step ii) of the method. To improve the quality of the texturing, since the images 40a and 40b are sharp, the image is identified the image plane of which is the closest to the surface element. In this case, in FIG. 6, it is the image referenced 40b, which contains the most details of the area of the scene delimited in the 3D model by the surface element.

The image 40b is therefore selected for texturing the surface element 55. To this end, the texturing is first performed on the corresponding polygon 65 of the 2D model. To do this, the image 40b is projected onto the 2D model so as to assign to the polygon, a texture property from the pixel information of the image 40b superimposed on the corresponding surface element.

When a pixel 80 of the image is fully superimposed on the polygon, the texture property is defined associated with the area having the dimensions of the pixel by associating thereto the color of the corresponding pixel.

In the case where a pixel of the image is partially superimposed on the surface element, as is the case, for example, of the pixel referenced 85 in FIG. 7, the texture property of the pixel is assigned to the area having the form of the portion of the pixel totally covered by the polygon of the 2D model.

Thus, each polygon has a texture faithfully reproducing the details of the area of the scene that it models.

The sequence of steps i) to iii) described above is preferably performed for all polygons in the 2D model corresponding to the different surface elements of the 3D model. Thus, a 2D textured mesh is obtained.

Figure 9:
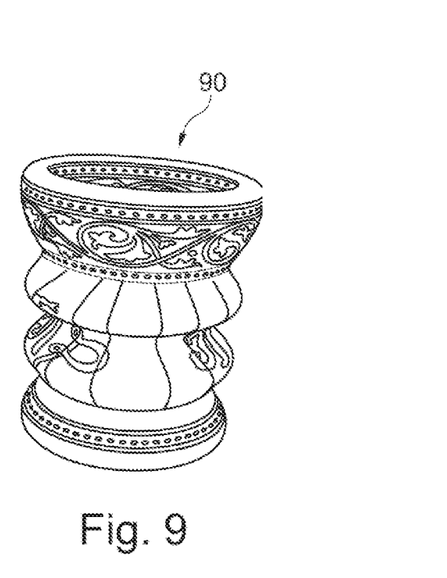
FIG. 9 is an image representing the display of the textured 3D model produced from the textured 2D model of FIG. 8.

The 3D model may then be textured by assigning, univocally, to each surface element, the texture or textures associated with the corresponding polygon, as illustrated in FIG. 9.

In particular, the storage of the texture properties of each surface element is facilitated, since the positions of the polygons are known. It is therefore not necessary to store the textures in a 3D format in the memory of a computer implementing the method. This thus restricts the use of powerful processing means, such as a graphics card of a computer, for displaying the textured model.

Of course, the invention is not limited to the implementations described and to the example given above, described for illustrative purposes.

The invention claimed is:

1. A method for texturing a 3D model of at least one scene, the method comprising:
   a) meshing with surface elements of a point cloud representing the scene to generate the 3D model, each surface element representing an area of the scene,
   b) unfolding the 3D model for obtaining a 2D model formed of a plane mesh formed of polygons, each surface element corresponding to a single polygon, and vice versa, and
   c) for at least one of the surface elements,
      i) identifying, from an image bank, of the images representing the area of the scene and which have been acquired by a camera the image plane of which has a normal direction, in the corresponding acquisition position, forming an angle ($\theta_{a-b}$) less than 10° with a direction normal to the face of the surface element,
      ii) selecting of an image from the identified images, and,
      iii) associating a texture property with a corresponding polygon, from a piece of information of a pixel of the selected image which is superimposed on the surface element, to produce a textured 2D model, and
   d) producing the textured 3D model by matching the 3D model and the textured 2D model,
   wherein the method further comprises:
   a step i') between steps i) and ii), wherein sharp images are identified from among the images determined in step i), and
   a step i"), which is intermediate between steps i') and ii), wherein the image is identified taken by the camera the image plane of which is the closest to the surface element.

2. The method according to claim 1, comprising a step prior to step a), wherein the scene is discretized in the form of the point cloud, from an image bank identical to the image bank used in step i) comprising images each representing a portion of the scene seen by at least one camera and wherein at least two images acquired at different positions represent portions of the scene that overlap.

3. The method according to claim 2, wherein the rate of overlap between said two images acquired at different positions is greater than 70%.

4. The method according to claim 1, wherein in step i), the image is selected whereof the image plane of the camera has a normal direction, in the corresponding acquisition position, making the smallest angle, with a direction normal to the face of the surface element.

5. The method according to claim 1, wherein prior to step a), the image bank implemented in step i) is generated by moving, in a plurality of acquisition locations, a scanning device comprising at least one camera, and, at each acquisition location, a portion of the scene seen by the scanning device is acquired by taking at least one image by way of the camera, the acquisition locations being selected such that the portions of the scene seen by the scanning device in two respective consecutive acquisition locations at least partially overlap.

6. The method according to claim 1, wherein more than 50 pixels per mm² are at least partially superimposed inside at least one polygon, on the basis of the area of the polygon.

7. The method according to claim 1, wherein a visual representation of the textured 3D digital model of a scene is displayed on a screen of a computer or an augmented reality headset.

8. The method according to claim 1, wherein the images of the image bank comprise metadata comprising, for each pixel of an image, at least one property of the material constituting the portion of the scene imaged by the pixel.

9. The method according to claim 8, wherein the property of the material is a thermal property and/or an electrical property and/or a mechanical property and/or a magnetic property and/or a radiographic property.

10. The method according to claim 1, wherein prior to step a), the discretization of the scene is obtained by photogrammetric processing of images in the image bank.

11. The method according to claim 1, wherein the mesh formed in step a) comprises quadrangular elements and/or triangular surface elements.

12. The method according to claim 1, wherein each polygon of the 2D model having a shape and dimensions identical to the surface element corresponding thereto in the 3D model.

13. The method according to claim 1, wherein the texture property being the color of the pixel or a piece of metadata associated with the pixel.

14. The method according to claim 1, wherein the angle ($\theta_{a-b}$) is formed to be less than 5°.

15. The method according to claim 1, wherein the angle ($\theta_{a-b}$) is formed to be less than 3°.

16. The method according to claim 1, wherein step c) is performed for all of the surface elements.

17. A computer for texturing a 3D model of at least one scene, the computer comprising:
  a. at least one storage which records an image bank and associated metadata, and instructions for texturing the 3D model of the at least one scene, and
  b. a processor for executing the instructions by being configured to:
   a) mesh with surface elements of a point cloud representing the scene to generate the 3D model, each surface element representing an area of the scene,
   b) unfold the 3D model for obtaining a 2D model formed of a plane mesh formed of polygons, each surface element corresponding to a single polygon, and vice versa, and
   c) for at least one of the surface elements,
    i) identify, from the image bank, of the images representing the area of the scene and which have been acquired by a camera the image plane of which has a normal direction, in the corresponding acquisition position, forming an angle ($\theta_{a-b}$) less than 10° with a direction normal to the face of the surface element,
    ii) select of an image from the identified images, and,
    iii) associate a texture property with a corresponding polygon, from a piece of information of a pixel of the selected image which is superimposed on the surface element, to produce a textured 2D model, and
  d) produce the textured 3D model by matching the 3D model and the textured 2D model,
 wherein the processor is further configured to:
 between i) and ii), i') identify sharp images from among the images determined in i), and
 intermediate between i') and ii), i'') identify the image taken by the camera, the image plane of which is the closest to the surface element.

18. A non-transitory computer readable medium having stored thereon a program that when executed by a computer causes the computer to implement a method for texturing a 3D model of at least one scene, the method comprising:
  a) meshing with surface elements of a point cloud representing the scene to generate the 3D model, each surface element representing an area of the scene,
  b) unfolding the 3D model for obtaining a 2D model formed of a plane mesh formed of polygons, each surface element corresponding to a single polygon, and vice versa, and
  c) for at least one of the surface elements,
   i) identifying, from an image bank, of the images representing the area of the scene and which have been acquired by a camera the image plane of which has a normal direction, in the corresponding acquisition position, forming an angle ($\theta_{a-b}$) less than 10° with a direction normal to the face of the surface element,
   ii) selecting of an image from the identified images, and,
   iii) associating a texture property with a corresponding polygon, from a piece of information of a pixel of the selected image which is superimposed on the surface element, to produce a textured 2D model, and
  d) producing the textured 3D model by matching the 3D model and the textured 2D model,
 wherein the method further comprises:
 a step i') between steps i) and ii), wherein sharp images are identified from among the images determined in step i), and
 a step i''), which is intermediate between steps i') and ii), wherein the image is identified taken by the camera the image plane of which is the closest to the surface element.

* * * * *